United States Patent [19]
Lacey et al.

[11] Patent Number: 5,245,868
[45] Date of Patent: Sep. 21, 1993

[54] PISTON STOP FOR FREE PISTON SHOCK TUBE/TUNNEL

[75] Inventors: John J. Lacey, Minnetonka, Minn.; George J. Streithorst, Lebanon; Hallock F. Swift, Dayton, both of Ohio

[73] Assignee: Fluidyne Engineering Corporation, Minneapolis, Minn.

[21] Appl. No.: 817,273

[22] Filed: Jan. 3, 1992

Related U.S. Application Data

[63] Continuation-in-part of Ser. No. 473,871, Feb. 2, 1990, Pat. No. 5,115,665.

[51] Int. Cl.⁵ ............................................. G01M 9/00
[52] U.S. Cl. ...................................... 73/147; 73/12.07
[58] Field of Search ................................... 73/12, 147

[56] References Cited

U.S. PATENT DOCUMENTS

| | | | |
|---|---|---|---|
| 4,696,182 | 9/1987 | Meir | 73/12 |
| 4,898,028 | 2/1990 | Brehm | 73/147 |
| 5,115,665 | 5/1992 | Lacey, Jr. | 73/147 |

*Primary Examiner*—Donald O. Woodiel
*Attorney, Agent, or Firm*—Dorsey & Whitney

[57] ABSTRACT

A free piston shock tube/tunnel having a mechanism for stopping the piston or controlling the movement of the piston near the diaphragm end of the compression tube. The mechanism includes a generally annular protrusion positioned at the diaphragm end of the compression tube and extending upstream from the diaphragm to engage the piston at a point where the velocity of the piston is substantially at a minimum. The annular protrusion is spaced inwardly from the compression tube and has an inner diameter greater than the diameter of the shock tube.

19 Claims, 3 Drawing Sheets

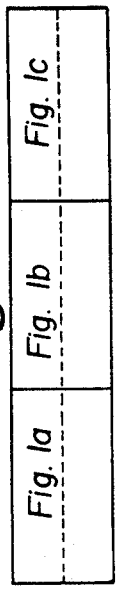
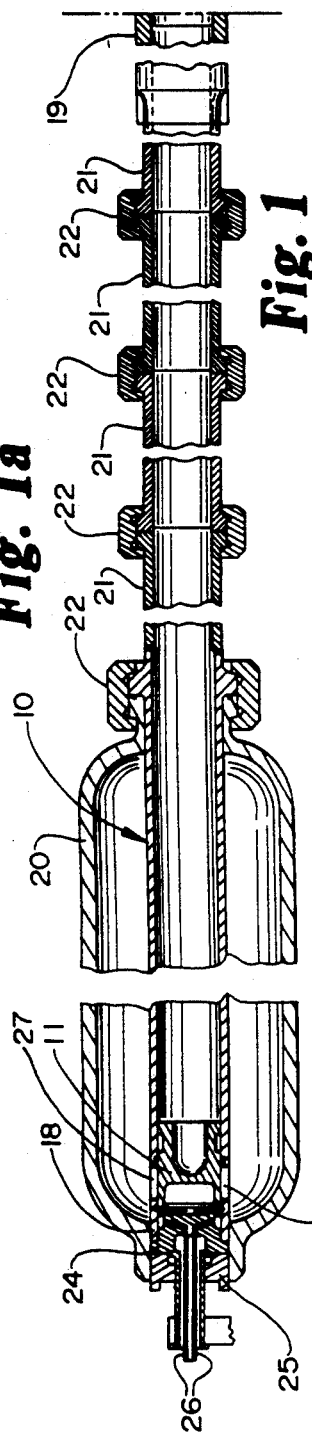
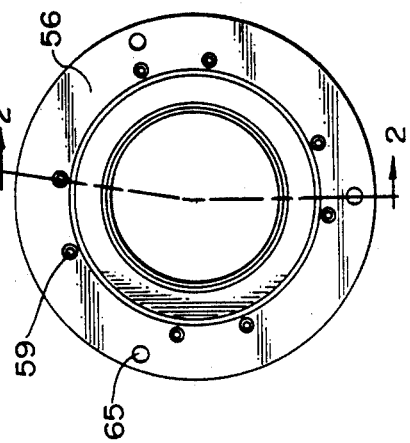
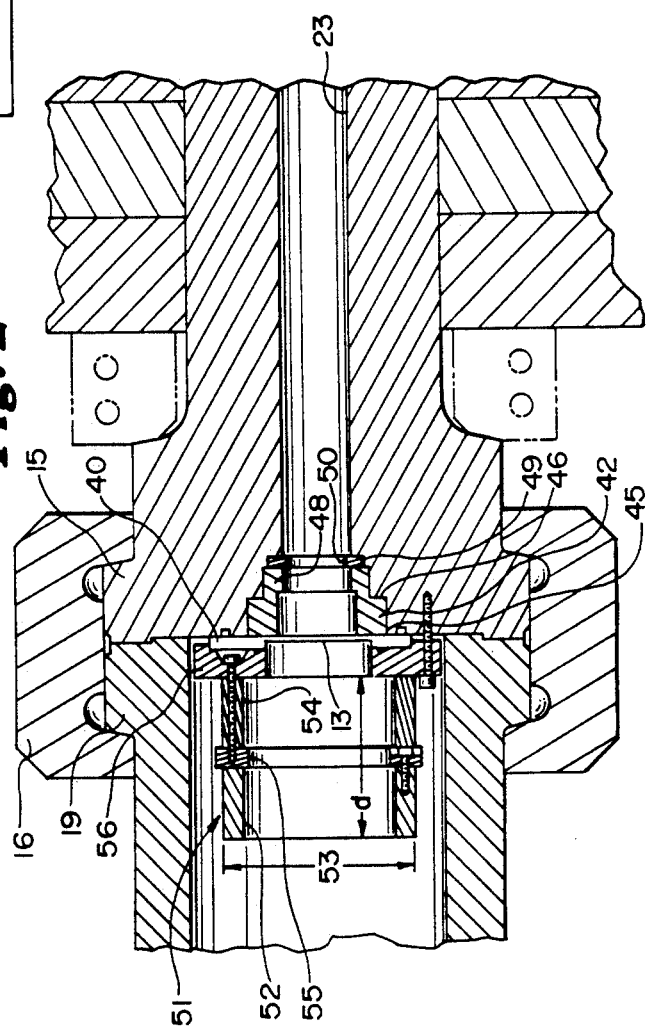

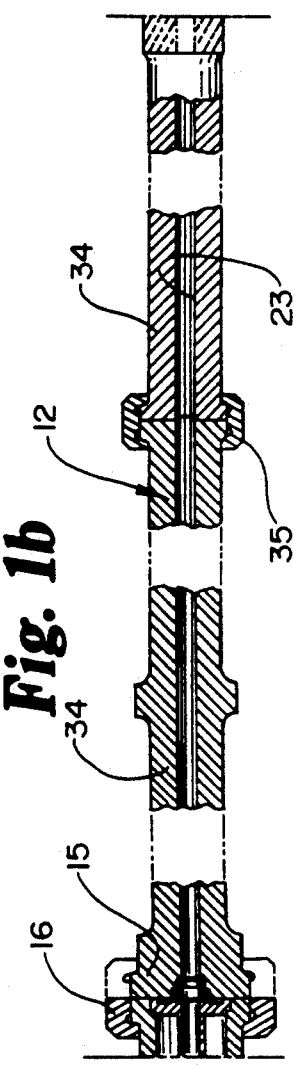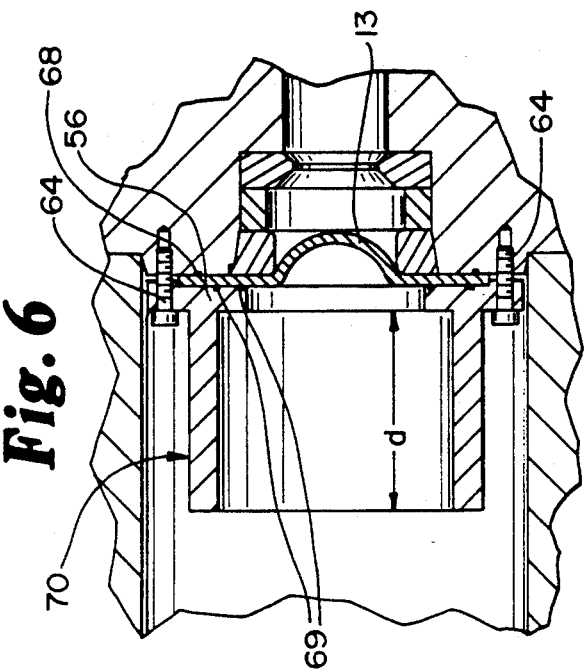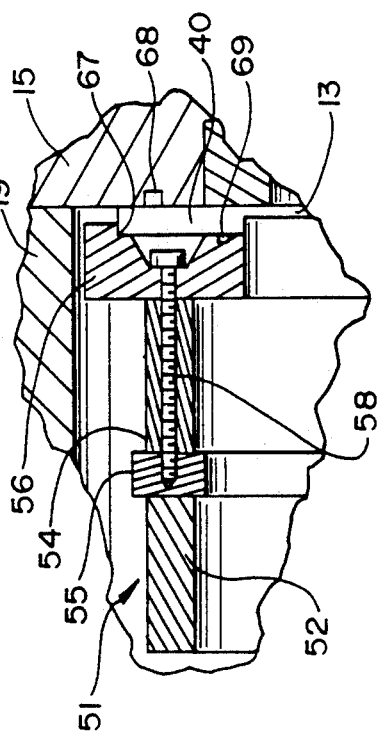

PISTON STOP FOR FREE PISTON SHOCK TUBE/TUNNEL

This is a continuation-in-part of U.S. application Ser. No. 07/473,871 filed Feb. 2, 1990, now Pat. No. 5,115,665.

BACKGROUND OF THE INVENTION

1. Field of the Invention

The present invention relates to a free piston shock tube/tunnel, and more particularly, to a free piston shock tube/tunnel with an improved piston stop having a means to control the movement of the piston during the last distance of its motion along the compression tube toward the diaphragm.

2. Description of the Prior Art

Free piston shock tube/tunnels have existed since the 1950's. During operation, free piston shock tube/tunnels are able to generate a shock wave of extremely high pressure and high temperature at a test site for a desired duration or test time. Free piston shock tube/tunnels are principally used to provide test conditions for aerodynamic conditions and studies relating to rocket nose cones, space re-entry vehicles, and other hypersonic aircraft.

In general, a free piston shock tube/tunnel includes an elongated, generally cylindrical compression tube containing a compression or driver gas such as helium. The compression tube is closed at one end by a diaphragm with a preselected rupture pressure. The compression tube is provided with a compression piston adapted for movement from a piston end of the tube toward the diaphragm end. Connected to the diaphragm end of the compression tube is an elongated shock tube having a test end remote from the diaphragm and being filled with a low pressure driven gas such as ambient air. When the piston is moved from the piston starting end of the compression tube toward the diaphragm end, the gas within the compression tube is compressed, thus generating pressure and causing the diaphragm to rupture. The rupturing of the diaphragm causes a volume of the compression gas to pass through the ruptured diaphragm and into the connected shock tube to form a shock wave. The shock wave compresses the driven gas during movement through the shock tube, thereby creating the desired test conditions at the test site. In the case of a shock tunnel, the compressed gas is further processed through a nozzle at the final test site.

The piston in a conventional free piston shock tube/tunnel is driven by compressed gas introduced behind the piston. During the compression movement of the piston toward the diaphragm, the gas in the compression tube can be compressed to pressures a high as 2,000 atmospheres or greater. This in turn can generate a shock wave in the shock tube which can create test conditions in the driven gas with temperatures as high as 12,000K. and pressures as high as 3,000 atm.

The shock tube is generally cylindrical construction having a single, constant diametrical dimension less than that of the diametrical dimension of the compression tube. In typical free piston shock tunnel structures, the diameter of the compression tube is at least about three times greater than the diameter of the shock tube.

Despite the utilization of free piston shock tube/tunnels for nearly 40 years. and despite continuing studies for the purpose of more fully understanding the operation, and optimizing the performance, of free piston shock tube/tunnels, their general construction has not changed significantly. A typical free piston shock tunnel is disclosed in Patent Cooperation Treaty publication number WO 89/02071 by Raymond Stalker. Published studies relating to the performance and operation of free piston shock tube/tunnels include an article entitled "Pressure Losses In Free Piston Driven Shock Tubes" by N. W. Page and R. J. Stalker in Shock Tubes and Waves (14th International Symposium on Shock Tubes and Shock Waves), August, 1983 at page 118 and an article entitled "The Piston Motion In A Free Piston Driver For Shock Tubes And Tunnels" by Hans. G. Hornung at GALCIT, California Institute Of Technology, 1988.

One deficiency of prior art free piston shock tube/tunnels has been the lack of an efficient means for stopping or controlling the movement of the piston during its final stages of motion along the compression tube toward the diaphragm without causing damage to the piston or the shock tube. This deficiency and the problems which result become more prevalent as the size and speed of the piston increase. Several mechanisms currently exist in the prior art for stopping movement of the piston at the end of its stroke. In one such mechanism, the piston is stopped by a plurality of cylindrical pads of non-metallic material. Typically, four pads of fixed length have been used. However, due to the high temperatures and pressures developed in this area, such pads become charred. This results in the inside of the shock tube/tunnel being coated with an undesirable film of residue. After several operations, the pads are no longer useful. Further, only a limited range of conditions can be tested because of the fixed length of such pads. When conditions outside of this limited range have been tested, damage to the piston and/or the compression tube often results.

In a second mechanism, the piston is stopped by a simple decrease in compression tube diameter. This, however, has the disadvantage of either shortening the compression stroke of the piston or extending the length of the compression tube. In either event, the modification is a rigid structure which is not designed to accommodate off-design conditions. A mechanism of this type is suggested by J. W. Willard in a paper entitled "Design And Performance Of The JPL Free-Piston Shock Tube" presented at the Fifth Hypervelocity Techniques Symposium in March of 1967. This mechanism involves reducing the diameter of the compression tube at the diaphragm end by placement of a sleeve member within the compression tube. This sleeve member, however, is not designed to be compressed or collapsed upon engagement with the piston, has an outer diameter substantially the same as the internal diameter of the compression tube and is designed for a relatively low operational range of energies.

Thus, although various mechanisms exist for the purpose of stopping movement of the piston and minimizing possible damage to the piston and compression tube, problems continue to exist. Accordingly, there is a need in the art for an improved piston stop for a free piston shock tube/tunnel by which the impact of the piston can be minimized and in which the various other limitations of prior art mechanisms can be overcome.

SUMMARY OF THE INVENTION

In contrast to the prior art, the free piston shock tube/tunnel of the present invention includes a mechanism for stopping the piston, and more particularly, a mechanism which preferably provides for a controlled stopping of the piston at its point of minimal velocity.

Although the impact of the piston at the diaphragm end of the compression tube can be quite severe, calculations from prior studies have shown that for many useful conditions, the piston velocity is reduced to near zero at a location spaced upstream from the diaphragm. This reduced velocity is then followed by an increase in piston velocity prior to engagement with the diaphragm end. The mechanism of the present invention is preferably designed to "catch" or engage the piston as close to this minimum velocity point as possible. Further, the mechanism of the present invention is capable of continuing to be useful after operation at off-design conditions despite much larger energy impacts on previous operations. Still further, the mechanism of the present invention can be easily modified to meet the needs of other operational conditions, if desired, therefore providing increased flexibility of performance.

More specifically, the piston stop mechanism of the present invention includes a generally annular or tubular protrusion extending upstream from the diaphragm end of the compression tube and having its outer wall surface spaced from the inner wall of the compression tube. The annular protrusion has both an inside and an outside diameter less than the diameter of the compression tube and greater than the internal diameter of the shock tube. The protrusion further has at least a portion constructed from a compressible or collapsible material. The protrusion is designed to have a length which will preferably be engaged by the piston at the point of piston travel in which the piston is substantially at minimum velocity. In the preferred embodiment, the protrusion is constructed of a service brake portion and an emergency brake portion which are formed of different materials.

Accordingly, it is an object of the present invention to provide an improved free piston shock tube/tunnel having an improved means for stopping the piston during its travel along the compression tube.

Another object of the present invention is to provide an improved free piston shock tube/tunnel in which the piston stop is designed to engage the piston at a point of substantially minimum piston speed.

A further object of the present invention is to provide an improved free piston shock tube/tunnel having a piston stop which is capable of increased operational energies and greater flexibility.

A still further object of the present invention is to provide an improved free piston shock tube/tunnel having a readily replaceable piston stop.

These and other objects of the present invention will become apparent with reference to the drawings, the description of the preferred embodiment and the appended claims.

DESCRIPTION OF THE DRAWINGS

FIG. 2 is an enlarged view, partially in section, of a portion of the free piston shock tube/tunnel in the area of connection between the compression tube and the shock tube showing a preferred embodiment of the piston stop in accordance with the present invention as viewed along the section line 2—2 of FIG. 3.

FIG. 3 is an elevational view of the diaphragm end of the brake and diaphragm mount and showing the section line 2—2 from which FIG. 2 is viewed.

FIG. 4 is an enlarged, fragmentary view, partially in section, showing a portion of the piston stop of the present invention and its relation to the diaphragm and compression tube.

FIG. 6 is a view similar to that of FIG. 2 showing an alternate design of a piston stop in accordance with the present invention.

DESCRIPTION OF THE PREFERRED EMBODIMENT

Figure 1C:
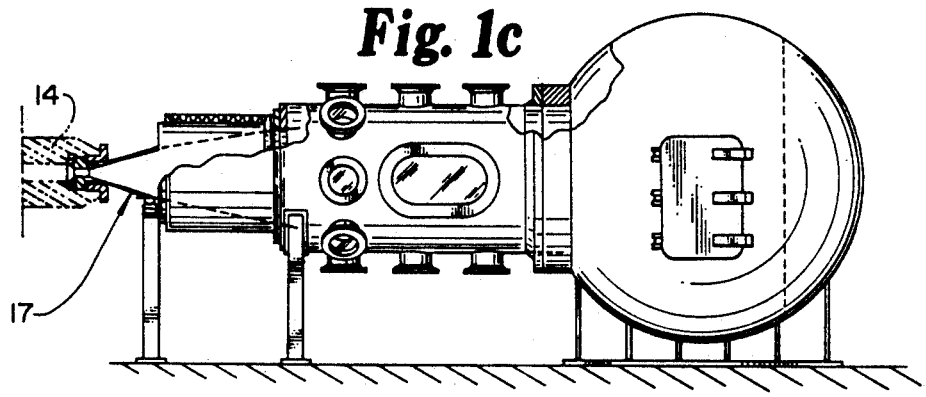
FIG. 1 is comprised of FIGS. 1a, 1b and 1c and is a side view, partially in section, of the free piston shock tube/tunnel in accordance with the present invention.

General reference is first made to FIG. 1 showing a side view of the elongated free piston shock tube/tunnel of the present invention. As illustrated, the shock tube/tunnel generally includes an elongated compression tube 10 and an elongated shock tube 12 connected end to end with the compression tube 10 via an appropriate connecting collar 16. A free piston 11 is adapted for movement from one end of the compression tube 10 toward the other for the purpose of compressing a compression gas within the tube 10. A diaphragm 13 (FIG. 2) is positioned in the area of connection between the compression tube 10 and the shock tube 12.

In the preferred embodiment, the compression tube 10 has a generally cylindrical configuration and extends from a first or piston end 18 to a second or diaphragm end 19. Normally, the compression tube 10 is constructed of high strength steel and is sufficient to withstand pressures as high as 2,000 atmospheres and temperatures as high as 7,000K. for the short time required. A portion of the compression tube 10 near the piston end 18 is surrounded by a secondary buffer 20 for the purpose of storing the gas which ultimately accelerates the piston. The actual length of the compression tube 10 is a matter of shock tube/tunnel design. Generally, it is contemplated that the compression tube in a free piston shock tube/tunnel in accordance with the present invention will be at least 33 meters in length. In the preferred embodiment it is shown that the compression tube 10 is made up of a plurality of compression tube sections 21. These are connected with one another by corresponding split hub clamps 22 in a manner known in the art. The compression tube 10 is filled with a driver gas such as helium which is capable of undergoing a generally quasi-steady adiabatic compression during movement of the piston. Various other gases, however, may also be used.

The piston end 18 of the compression tube 10 is closed by a closure head 24 which is retained relative to the compression tube 10 and the buffer 20 via the end nut 25. The end nut 25 is threadedly retained by internal threads at the end of the buffer 20. Conventional means 26 are provided for the purpose of introducing a compressed piston driving gas behind the piston 11 for the purpose of driving the piston toward the right as viewed in FIG. 1. As the piston 11 moves forwardly toward the right as viewed in FIG. 1, the ports 27 in the compression tube 10 are opened. This allows the gas from the secondary buffer 20 to flow into the volume behind the piston 11, to thereby cause its acceleration. The buffer gas can be compressed to a pressure of 200 atm. or greater. It is contemplated that the mechanism for controlling the actuation and driving of the piston 11 will be similar to those known in the art.

Figure 7:
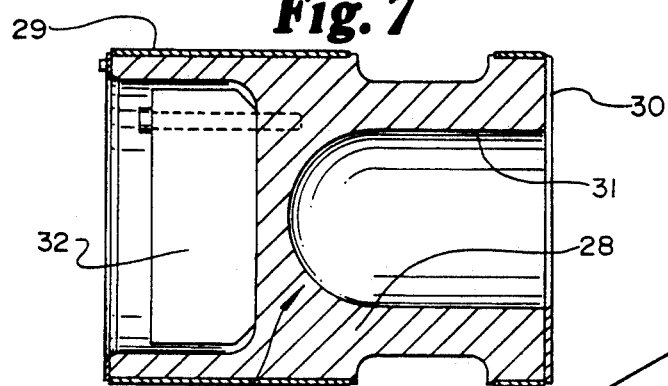
FIG. 7 is a cross sectional view of the piston.

As illustrated in FIG. 7, the piston includes a main body 28, a pair of outer surface bearings 29 and a strike plate 30. The body 28 includes a recessed portion 31 to accommodate an energy absorption mechanism or the like. The piston further includes a weight material 32 which provides the piston 11 with sufficient mass to perform the desired compression during operation of the shock tube/tunnel. During movement of the piston 11 from the piston end 18 toward the diaphragm end 19, the bearings 29, 29 slide along the inside cylindrical surface of the compression tube 10.

The shock tube 12 includes a first or diaphragm end 15 and a second or test end 14. As illustrated in FIG. 1 and also in FIG. 2, the diaphragm end 15 of the shock tube 12 is connected with the diaphragm end 19 of the compression tube 10 via the hub clamp 16. The test end 14 of the shock tube 12 is provided with any appropriate test mechanism desired. The preferred embodiment illustrated in FIG. 1 illustrates a conventional test end for a shock tunnel, with a conventional test nozzle structure 17 associated with the shock tube 12 for testing purposes. It is contemplated, however, that the nozzle structure 17 could be removed, with the structure of the present invention operating as a free piston shock tube.

The shock tube 12 of the preferred embodiment has a generally cylindrical or tubular configuration with a cylindrical exterior surface and an internal cylindrical bore 23. The shock tube 12 is preferably constructed of a material such as high strength steel.

The actual length of the shock tube 12 is a matter of design determined by the test conditions desired and various other parameters. In the preferred embodiment, the test tube 12 is comprised of a plurality of shock tube sections 34 which are connected in end-to-end relationship with one another via split hub clamps 35.

As illustrated best in FIG. 2, a diaphragm 13 is positioned and retained in the area of connection between the diaphragm ends 19 and 15 of the compression tube 10 and shock tube 12, respectively. The diaphragm 13 which has a predetermined rupture pressure is retained by a brake and diaphragm mount 56 as will be described in greater detail below. The diaphragm 13 is a conventional diaphragm existing in the shock tube/tunnel art having an enlarged annular portion 40 seated within an annular recess 67 in the mount 56.

The diaphragm end 15 of the shock tube 12 is provided with a replaceable diaphragm impact ring 42 which is seated within a corresponding recess in the end 15. The impact ring 42 includes an outer annular shoulder portion 45 which is adapted for seating engagement within a corresponding recess 46 in the end 15. An inner recessed surface 44 is provided in the impact ring 42 for the purpose of accommodating the petals of the diaphragm 13 when it ruptures. Specifically, the length of the recessed area 44 is designed such that when the diaphragm 13 ruptures, the ruptured diaphragm will substantially conform to the recessed portion 44, thus precluding any restriction within the shock tube. The outermost end 48 of the impact ring 42 also seats within a corresponding recessed portion of the end 15. The end portion 48 is provided with an internal diameter approximating the internal diameter of the shock tube 12.

Positioned between the forward end surface of the end 48 and a recessed surface of he shock tube 12 is a selectively replaceable orifice insert 49 having a pair of flat, generally parallel surfaces which are captured and retained between the outermost end of the impact ring 42 and a portion of the shock tube 12. The orifice insert 49 is provided with an internal opening 50 having a diameter less than or equal to the internal diameter of the shock tube 12.

Positioned at the diaphragm end of the compression tube 19 and upstream from the diaphragm 13 is the piston stop mechanism 51 for stopping movement of the piston 11 along the compression tube and controlling its movement as it reaches the diaphragm end. The piston stop mechanism 51 is illustrated best in FIGS. 2, 4 and 5. In general, the piston stop mechanism 51 is a generally annular or tubular protrusion having an internal diameter or dimension 53 which is smaller than the internal diameter of the compression tube 19 and larger than the internal diameter 23 of the shock tube 12. The annular protrusion 51 is positioned within the compression tube 19 and has an outer diameter or dimension which is spaced inwardly from the inner diameter of the diaphragm end of the compression tube 19. Thus, the outer diameter or dimension of the annular member 51 is less than the inner diameter of the compression tube 19.

The overall length "d" of the protrusion 51 is preferably designed so that its upstream end will be engaged by the forward end of the piston when the piston is substantially at its minimal velocity. As described above, calculations indicate that the piston speed in a free piston shock tube/tunnel is reduced to near zero at a location slightly upstream from the diaphragm location. Pursuant to the present invention, it is intended that the length "d" of the protrusion 51 be such as to engage the piston at this point. This particular length "d" will vary depending upon the piston size and speed, the diameter of the compression tube and various other factors. A further factor is what applicants refer to as the "trapped volume" between the diaphragm and the leading edge of the piston when it reaches such minimal velocity. However, such point of minimal piston velocity can be calculated or approximated in accordance with equations, etc. known in the art.

In the preferred embodiment, the protrusion 51 is comprised of an outer or upstream annular shaped service brake portion 52, an inner or downstream annular shaped emergency brake portion 54 and an emergency brake head 55 positioned between the service and emergency brakes 52 and 54. Although the preferred embodiment shows the protrusion as being generally cylindrical, with a circular cross-section, annular protrusions with other cross-sectional configurations such as a polygonal configuration may also be utilized. Preferably, the service brake portion 52 is constructed of a relatively soft, compressible or collapsible material, while the emergency brake portion 54 is constructed of a relatively hard, less compressible or less collapsible material. It is contemplated that various non-metal materials including certain plastics such as polyethylenes, as well as various metal materials may be used. Most preferably, the service brake portion 52 is constructed of a relatively soft, low-yield-strength material such as aluminum, while the emergency brake portion 54 is constructed of a relatively high-yield-strength material such as steel.

The brake head 55 functions to connect the brakes 52 and 54 and also to connect the entire protrusion 51 of the embodiment of FIG. 2 to the brake and diaphragm mount 56. As illustrated best in FIG. 5, the brake head 55 is connected with the service brake portion 52 by a plurality of threaded cap screws 61 extending through openings 62 in the head 55 and into corresponding threaded holes in the service brake portion 52. The brake head 55 is provided with a plurality of indentations 57 to accommodate the heads of the cap screws 61. The head 55 and the emergency brake portion 54 are connected with the brake and diaphragm mount 56 by a plurality of threaded cap screws 58. These cap screws extend through openings 59 in the mount 56 and openings 60 in the portion 54 and into threaded holes in the brake head 55. The brake and diaphragm mount 56, and thus the entire protrusion 51, is connected to the shock tube/tunnel by means of a plurality of threaded cap screws 64 extending through a plurality of openings 65 in the mount 56 and into corresponding threaded openings in the diaphragm end of the shock tube 12. Both such connections are illustrated in FIG. 2 by virtue of the section line illustrated in FIG. 3. The surface of the brake and diaphragm mount 56 adjacent to the diaphragm 13 includes a recessed portion 67 for receiving and containing the diaphragm 13. A plurality of seal members 68 and 69 are positioned on opposite sides of the diaphragm to seal the diaphragm with respect to the end of the shock tube 12 and the brake and diaphragm mount 56.

With the structure as described above, the entire protrusion 51 or the service brake portion 52 can be readily replaced. During operation, when the leading edge of the piston engages the outer edge of the service brake 52, the momentum of the piston, to the extent there is any, is absorbed by the portion 52. The portion 52 is constructed from a material such as aluminum which because of such material or the configuration of the portion 52 will collapse and will bulge out an opposite sides when engaged by the piston. During normal operation, the force from the piston, if the protrusion 51 is of the proper length, will not be sufficient to collapse the emergency brake portion 54. However, if, for some reason, the momentum of the piston is such that the momentum of the piston cannot be totally absorbed by the service brake portion 52, the emergency brake portion 54 will absorb it. Because the protrusion 51, or a portion of it, is collapsed so that it bulges out during engagement by the piston, the outer diameter or dimension of the protrusion must be sufficiently less than the inner diameter of the compression tube to accommodate this tendency to bulge out during such collapse.

A further embodiment of a piston stop in accordance with the present invention is illustrated in FIG. 6. In FIG. 6, the protrusion 70 is a one-piece member having length "d" and diameter requirements similar to the embodiment of FIG. 2. The protrusion 70 of FIG. 6 is preferably constructed of a collapsible material such as aluminum or an aluminum alloy.

Figure 5:
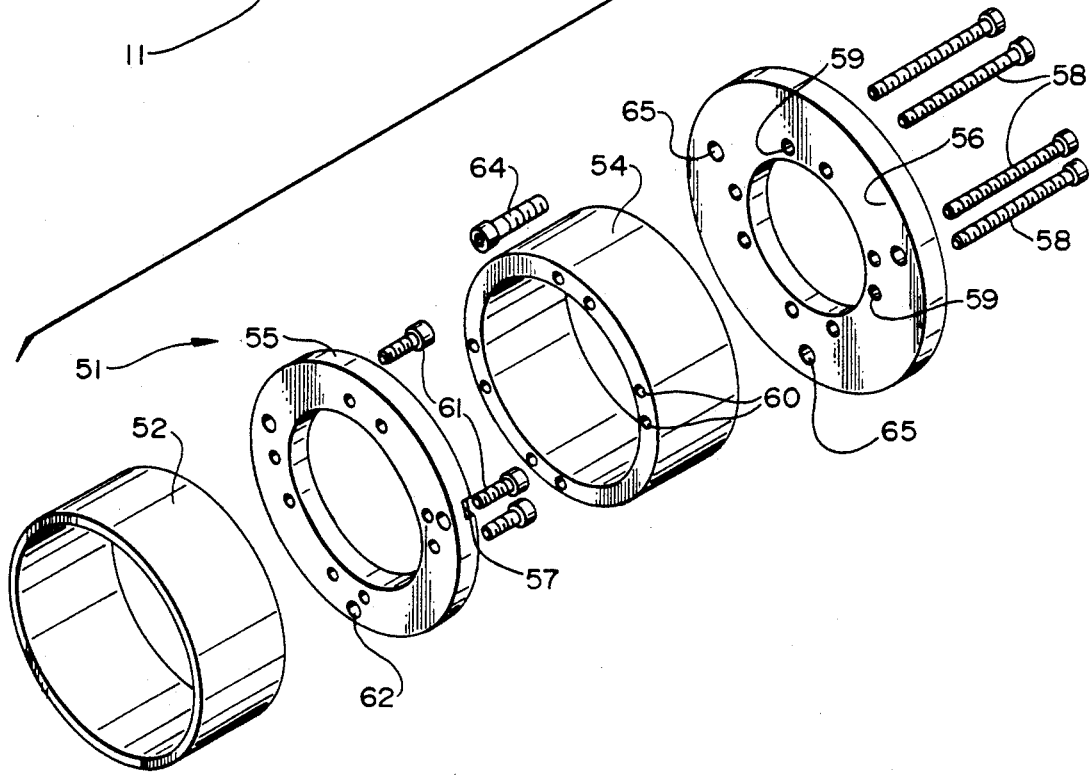
FIG. 5 is a perspective, broken apart view of the piston stop mechanism in accordance with a preferred embodiment of the present invention.

During operation of the free piston shock tube/tunnel of the present invention, the diaphragm 13 and the protrusion 51 of FIG. 2 or the protrusion 70 of FIG. 5 are positioned in the area between the compression tube 10 and the shock tube 12. The tubes 10 and 12 are thereafter joined together by a connecting hub, by a threaded connection or by some other means known in the art. The compression tube 10 is then filled with the desired driver gas such as helium. After the material to be tested is properly positioned at the test end 14 of the shock tube 12, the device is ready for actuation. Upon actuation, compressed air is introduced through the compressed air firing lines 26 into the area behind the piston 11. This causes the piston 11 to open the ports 27, allowing the compressed air in the secondary buffer 20 to enter the compression tube 10 behind the piston 11. This cases the piston 11 to move with great acceleration and velocity toward the diaphragm. It is common for the compressed air which drives the piston 11 to be pressurized to as high as 200 atm. or greater. This results in the piston 11 being driven to the diaphragm end 19 in a fraction of a second so that the speed of the piston 11 as it approaches the end 19 of the compression tube 10 will be about 300 meters per second or greater. The movement of the piston in this direction causes the helium within the compression tube to be highly compressed. Normally, such compression will be as high as 2,000 atm. or higher. When it reaches the rupture pressure of the diaphragm, the diaphragm ruptures and the compressed helium rapidly passes through the same, forming a shock wave in the shock tube 12. It is common for diaphragms usable in a free piston shock tube/tunnel of the type described in the present invention to have a rupture pressure of about 2,000 atm. or greater.

Calculations have shown that shortly before reaching the end of the compression tube 19, the piston 11 will slow to a stop or a minimal velocity, after which it will increase in velocity unless impeded. The protrusion 51 (FIG. 2) or 70 (FIG. 6) of the present invention is designed to engage the piston 11 substantially at this minimal velocity point and prevent or cushion further movement. It is contemplated that the protrusion 51 or 70 will be compressed or collapsed to some extent during this stopping of the piston 11.

Although the description of the preferred embodiment has been quite specific, it is contemplated that various modifications could be made without deviating from the spirit of the present invention. Accordingly, it is contemplated that the scope of the present invention be dictated by the appended claims rather than by the description of the preferred embodiment.

We claim:

1. A free piston shock tube/tunnel comprising:
   an elongated compression tube having a piston end and a diaphragm end;
   an elongated shock tube having a diaphragm end, a test end and an internal diameter, said diaphragm end of said shock tube being connected with said diaphragm end of said compression tube;
   a piston in said compression tube adapted for compression movement from said piston end toward said diaphragm end of said compression tube;
   a diaphragm positioned in the area of connection between said compression tube and said shock tube; and
   a selectively replaceable piston stop member comprising an annular protrusion extending upstream from the diaphragm end of said compression tube, said protrusion having an internal dimension greater than the internal diameter of said shock tube and having an outer dimension spaced from the inner diameter of said compression tube.

2. The shock tube/tunnel of claim 1 wherein said protrusion has a length extending upstream from the diaphragm end of said compression tube corresponding substantially to the distance of said piston from the diaphragm end of said compression tube at the point of minimal piston velocity.

3. The shock tube/tunnel of claim 1 wherein said protrusion is collapsible as a result of a predetermined force caused by engagement with said piston.

4. The shock tube/tunnel of claim 3 wherein said protrusion is constructed of a material which is aluminum based.

5. The shock tube/tunnel of claim 3 wherein said protrusion is comprised of at least two annular portions.

6. The shock tube/tunnel of claim 5 wherein at least two of said annular portions are constructed of different materials.

7. The shock tube/tunnel of claim 6 wherein at least two of said annular portions include a first portion adjacent to said diaphragm end of said compression tube and a second portion positioned upstream from said first portion.

8. The shock tube/tunnel of claim 7 wherein said second portion is collapsible as a result of a predetermined force caused by engagement with said piston and said first portion is collapsible at a force greater than said predetermined force.

9. The shock tube/tunnel of claim 8 wherein said second portion is constructed of an aluminum based material.

10. The shock tube/tunnel of claim 5 including a connecting head between at least two of said annular portions.

11. The shock tube/tunnel of claim 1 wherein said space between the outer dimension of said protrusion and the inner diameter of said compression tube is sufficient to accommodate bulging said protrusion resulting from its collapse.

12. The shock tube/tunnel of claim 1 wherein said annular protrusion is a one-piece member.

13. The shock tube/tunnel of claim 1 wherein the cross-sectional configuration of said annular protrusion is generally circular.

14. The shock tube/tunnel of claim 1 wherein said protrusion is comprised of first and second annular portions, said first annular portion adjacent to said diaphragm end of said compression tube and constructed of a relatively high-yield-strength material and said second annular portion positioned upstream from said first annular portion and constructed of a relatively low-yield-strength material.

15. A piston stop for a free piston shock tube/tunnel of the type having an elongated compression tube having an inner surface and a shock tube having an internal diameter, a piston in the compression tube and a diaphragm between the compression and shock tubes, said diaphragm having a compression tube side facing the compression tube and a shock tube side facing the shock tube, said piston stop comprising:

a selectively replaceable annular member fixed within the compression tube and positioned on the compression tube side of said diaphragm, said annular member further having an internal dimension greater than the internal diameter of the shock tube and an outer surface spaced from the inner surface of said compression tube.

16. The piston stop of claim 15 wherein said member is comprised of at least two annular portions.

17. The piston stop of claim 16 wherein at least two of said annular portions are constructed of different materials.

18. The piston stop of claim 17 wherein at least two of said annular portions include a first portion adjacent to said diaphragm and a second portion adjacent to said first portion.

19. The piston stop of claim 18 wherein said second portion is constructed of a relatively low-yield-strength material and said first portion is constructed of a relatively high-yield-strength material.

* * * * *